Patented Jan. 7, 1941

2,227,985

UNITED STATES PATENT OFFICE

2,227,985
STABILIZING OF POLYVINYL ACETAL RESINS

Donald R. Swan, Rochester, N. Y., assignor to Eastman Kodak Company, Rochester, N. Y., a corporation of New Jersey No Drawing. Application October 2, 1937, Serial No. 167,019

7 Claims. (Cl. 260—73)

This invention relates to the stabilization of polyvinyl acetal resins by incorporating sulfur or an acid or its salt containing sulfur having a valence algebraically less than +4, in the reaction mixture which is employed in its preparation. If desired, the stabilizing action may be applied to the polyvinyl intermediate, which is employed in preparing the acetal resin, or to the acetal resin after its preparation, but before it is heat-dried. It is desirable that the treatment take place under acid conditions so that it is the sulfur acid rather than the salt which reacts upon the polyvinyl compound.

The instability of polyvinyl acetal resins has been a problem in the art of making and using that type of resin. For instance, a product can be made therefrom and some time later the product might be dark and degraded, thus terminating its commercial usefulness.

One object of my invention is to prepare polyvinyl acetal resins which do not exhibit a tendency to degrade upon ageing or darken when heated. Another object of my invention is to render polyvinyl acetal resins stable so that they may be employed for use in making commercial products whose life is not shortened by the breakdown of the resin which might otherwise occur without a stabilization treatment such as in accordance with my invention.

The instability of polyvinyl acetal resins may be manifested in various ways, such as by the brittleness and increased color of an aged film of the resin. This characteristic is, of course, very detrimental in most cases where a resin film may be employed.

In the laboratory the amount of stability is determined by subjecting the product to an elevated temperature for a prescribed period of time. One method of determining the stability is by heating a sample of the resin to a temperature of about 180° C. in a stream of nitrogen and measuring the decomposition products formed. The amount of these products is determined by passing the gases given off over heated copper oxide which oxidizes these gases to carbon dioxide and water, whereupon the carbon dioxide gas is cooled and weighed.

The preferred method of ascertaining stability is to heat a sample of the resin at about 110° C. for 24 hours and then measure the loss of viscosity of a 5% solution of the resin in acetic acid. The viscosity may be determined in any customary manner, such as by the use of a viscosimeter. In this test a polyvinyl acetal resin, which has not been stabilized, shows a decided drop in viscosity. The following data illustrate the drop in viscosity of unstabilized polyvinyl acetal resins upon heating:

| | Original viscosity | Viscosity after heating for 24 hours at 110° C. |
|---|---|---|
| | Centipoises | Centipoises |
| Polyvinyl acetal resins which were not stabilized | 209 | 15 |
| | 199 | 11 |
| | 102 | 23 |

I have found that by incorporating sulfur or the sulfur compound in which the valence of the sulfur is less than 4, in the reaction mixture employed to prepare a polyvinyl acetal resin or by treating the polyvinyl intermediate used in its preparation that a resin of good stability is formed, as evidenced by testing the treated resin by the method outlined above. As the stabilized acetal resins do not darken or degrade upon heating or prolonged use, they are particularly adapted for use in the fine arts, such as in the making of photographic film. In the incorporating of a sulfur acid in the reaction mixture, it may be in the form of one of its salts, as the reaction mixture is of an acid nature and will convert the salt into the corresponding acid. In other cases it is preferred that either the aqueous acid be used or that the solution of the salt be applied under conditions tending toward the acid side.

Some of the compounds which may be used to stabilize polyvinyl acetal resins in accordance with my invention are:

1. Hydrogen sulfide and its organic and inorganic derivatives. In the case of organic derivatives a replaceable hydrogen or metallic atom should be attached to the sulfur.

Examples are hydrogen sulfide, sodium sulfide, sodium acid sulfide, mercaptans such as ethyl mercaptan or methyl mercaptan.

2. Elementary sulfur.

3. Acids of sulfur where the apparent sulfur valence is +2 and their salts.

Examples are sulfoxylic acid, its salts and organic derivatives, for instance sodium formaldehyde sulfoxylate. Thiosulfuric acid, its salts and organic derivatives, for instance sodium thiosulfate. Benzene sulfinic acid and its salts.

4. Acids of sulfur where the apparent sulfur valence is +3 such as hydrosulfurous acid and its salts.

The valence referred to is that determined by assuming that oxygen always has a valence of —2 and hydrogen always has a valence of +1 and is often referred to as the apparent valence of the sulfur.

An advantage of my invention where a sulfur acid is employed in the reaction mixture used to prepare the acetal resin, is that the sulfur compound will wash out completely from the resin. The amount of sulfur compound which may be employed to stabilize need only be on the order of 1% to get a satisfactory stabilization, this percentage being based on the weight of the polyvinyl ester or the polyvinyl alcohol which is used. Up to as much as 5% or even more can be employed, if desired, however I have found that with even very small amounts of the sulfur compounds that at least a partial degree of stabilization is effected. The following examples illustrate the stabilization of a polyvinyl acetal resin in accordance with my invention:

Example I 100 parts of polyvinyl acetate was dissolved in 300 parts of ethyl alcohol. One part of sodium hydrosulfite was added followed by 25 parts of hydrochloric acid and 55 parts of paraldehyde. The mass was kept at 40° C. for 4 days after which the reaction mixture was diluted with 3 volumes of ethanol and precipitated in water to give a white fibrous polyvinyl acetal resin. It was found that this resin did not change in viscosity after heating for 24 hours at 110° C. The following table shows the influence of small percentages of sodium hydrosulfite employed in the reaction mixture on the stability of the polyvinyl acetal resins formed therein:

| Percent sodium hydrosulfite | Viscosity after 24 hrs. at 110° C. |
| --- | --- |
|  | Centipoises |
| 0.14 | 50 |
| 0.4 | 115 |
| 0.7 | 115 |
| 0.0 | 34 |

It may be seen that a percentage on the order of 1/10 of 1% gave a certain degree of stability.

Example II 50 parts of polyvinyl alcohol was suspended in 400 parts of 95% ethanol. A mixture of 25 parts of paraldehyde and 35 parts of concentrated hydrochloric acid was added with stirring. 1.5 parts of sodium hydrosulfite was then stirred in. After 4 days at 40° C. the clear viscous dope was diluted with 95% ethanol, precipitated in cold water, washed free of acid and dried.

A 5% solution of the resin in glacial acetic acid had a viscosity of 1345 cps. After heating a dried sample for 24 hrs. at 110° C. a 5% solution in acetic acid showed a viscosity of 1737 cps.

It is a characteristic of sodium hydrosulfite, as well as many of the other sulfur compounds, that when it is employed in a large concentration such as 3% or more that the viscosity of the resin stabilized thereby is raised upon heating.

Example III 100 parts of polyvinyl acetate was dissolved in 250 parts of ethyl alcohol. A mixture of 30 parts of paraldehyde, 50 parts of butyraldehyde and 25 parts of concentrated hydrochloric acid was added with stirring. 3 parts of sodium hydrosulfite was then stirred in. After 4 days at 40° C. a clear viscous dope was formed, which was diluted with ethanol, precipitated, washed in cold water and dried. The resin had a viscosity of 88 cps. and after heating for 24 hrs. at 110° C. it exhibited a viscosity of 152 cps.

Example IV 100 parts of polyvinyl acetate was dissolved in 250 parts of ethyl alcohol. A mixture of 50 parts of paraldehyde, 25 parts of concentrated hydrochloric acid and varying amounts of sodium hydrosulfite as indicated in the table below was added with stirring. After 4 days at 40° C. the dope was diluted with 2 volumes of ethyl alcohol, precipitated in cold water, washed free of acid and dried. Heat tests were made on each of the 4 resins prepared with the following results:

| Run No. | Sodium hydrosulfite | Original viscosity | Viscosity after 24 hrs. at 110° C. |
| --- | --- | --- | --- |
|  | Percent | Centipoises | Centipoises |
| 1 | 0.5 | 98 | 52 |
| 2 | 1.0 | 109 | 77 |
| 3 | 3.0 | 112 | 114 |
| 4 | 5.0 | 127 | 126 |

Example V 100 parts of polyvinyl acetate was dissolved in 250 parts of ethyl alcohol. A mixture of 50 parts of redistilled paraldehyde and 25 parts of concentrated hydrochloric acid was stirred in followed by the addition of 5 parts of 5% aqueous sodium sulfide. After 4 days at 40° C., the mass was diluted with 2 volumes of ethyl alcohol and precipitated in cold water. The white fibrous material resulting was washed and dried and tested for stability. The resin was found to have a viscosity of 138 centipoises and after heating for 24 hours at 110° C., exhibited a viscosity of 156 centipoises.

Example VI 100 parts of polyvinyl acetate was dissolved in 250 parts of ethyl alcohol. A mixture of 50 parts of paraldehyde and 25 parts of concentrated hydrochloric acid was added with stirring and one part of sulfur was then incorporated. The components were thoroughly mixed and the mass was allowed to stand at 40° C. for 4 days. It was then diluted with about 3 volumes of ethanol and precipitated in water. After washing free of acid and drying, the resin was tested for stability. The viscosity, which before heating was 141 cps., was, after heating for 24 hours at 110° C., 145 cps.

Example VII 100 parts of polyvinyl acetate was dissolved in 250 parts of ethanol. A mixture of 50 parts of paraldehyde and 25 parts of concentrated hydrochloric acid was added with stirring, one part of sodium thiosulfate, commonly known to photographers as "hypo," was incorporated and the mass was maintained at 40° C. for four days. It was then diluted with ethyl alcohol, precipitated and dried at 50° C. The resin was tested for stability. Whereas the viscosity before heating was 136 cps., was found to be satisfactory, as shown by a slight rise in viscosity after heating at 110° C. for 24 hours, it was 150 cps.

Example VIII 100 parts of polyvinyl acetate was dissolved in 250 parts of ethanol and a mixture of 50 parts of paraldehyde and 25 parts of concentrated hydrochloric acid was added and stirred in.

Four parts of m-thiocresol was incorporated and the mass was maintained at 40° C. for four days, diluted with ethanol and precipitated. After washing and drying, the resin was tested for stability and the stability after heating was found to be substantially the same as prior to the heating.

The following resins are exemplary of those which may be stabilized in accordance with my invention. It is to be understood that this list is not limiting but illustrative.

Polyvinyl acetate and other esters
Polyvinyl co-polymers (polyvinyl chloride-acetate)
Polyvinyl acetaldehyde acetal
Polyvinyl formaldehyde acetal
Polyvinyl propionaldehyde acetal
Polyvinyl butyraldehyde acetal
Mixed polyvinyl acetals such as:
    Polyvinyl formaldehyde-acetaldehyde acetal
    Polyvinyl butyraldehyde-acetaldehyde acetal
    Polyvinyl benzaldehyde-acetaldehyde acetal
    Polyvinyl furfuraldehyde-acetaldehyde acetal
    Polyvinyl acetone acetaldehyde ketacetal
    Polyvinyl cyclohexanone acetaldehyde ketacetal The polyvinyl acetal resins, stabilized by my process, are particularly suitable for the preparation of photographic film or any other commercial product where the transmission of light is an important factor. Another instance of such a use is in an intermediate layer in the making of laminated or "safety" glass. These stabilized resins may, also, be employed for making artificial yarn, lacquers, molding compositions, impregnated textiles or laminated products. For instance, sheets of these stabilized resins may be laminated with layers of wood, metal, paper, glass, cellulose ester, etc. These stabilized resins may be employed for electrical insulation, especially where the insulated material, such as wire, is subjected to movement or bending. In some instances it may be found desirable to mix these stabilized polyvinyl resins with other plastic materials, such as cellulose acetate, acetate propionate or acetate butyrate; cellulose ethers, such as ethyl cellulose, gums, other resins, either natural or synthetic, waxes and oils.

Partial polyvinyl acetal resins may be stabilized in accordance with my invention. For example, if a polyvinyl butyraldehyde acetal resin, made by condensing butyraldehyde with polyvinyl alcohol according to French Patent No. 792,661 of Carbide and Chemicals Corporation in which from about 2.5 to about 4 molecules of polyvinyl alcohol are combined with each molecule of butyraldehyde, is dissolved in alcohol before heat-drying and subjected to the action of a sulphur acid, a stable acetal resin results which is especially adapted to use for preparing an intermediate layer in the making of laminated glass. If desired, the acetal resin may be treated with the sulphur by adding it to the solution of the resin which is to be employed to make the commercial product, such as sheeting. Also, if desired, the treatment may be applied to the polyvinyl alcohol or to the polyvinyl ester from which the alcohol is made instead of to the resin itself.

The acetals which may be stabilized by my process need not be complete acetals. The polyvinyl acetal resins listed herein may be either complete acetals or they may be resins having residual acetyl and/or hydroxyl groups remaining on the molecule.

I claim:

1. The process of stabilizing a polyvinyl acetal resin which comprises condensing an aldehyde with a polyvinyl fatty acid ester in the presence of a strong mineral acid and less than 5% (based on the weight of the polyvinyl fatty acid ester) of a water-soluble compound selected from the group consisting of $M_2S_2O_4$ and $M_2S_2O_3$, M being selected from the monovalent sub-group of Group 1 of the periodic table.

2. The process of stabilizing a polyvinyl acetal resin which comprises condensing an aldehyde with a polyvinyl fatty acid ester in the presence of hydrochloric acid and less than 5% (based on the weight of the polyvinyl fatty acid ester) of a water-soluble compound having the formula $M_2S_2O_4$, M being selected from the monovalent sub-group of Group 1 of the periodic table.

3. The process of stabilizing a polyvinyl acetal resin which comprises condensing an aldehyde with a polyvinyl fatty acid ester in the presence of less than 5% (based on the weight of the polyvinyl fatty acid ester) of a compound selected from the group consisting of an alkali metal thiosulfate and an alkali metal hydrosulfite and more than a chemically equivalent amount of a strong mineral acid.

4. The process of stabilizing a polyvinyl acetal resin which comprises condensing an aldehyde with a polyvinyl fatty acid ester in the presence of less than 5% (based on the weight of the polyvinyl ester) of sodium hydrosulfite and more than a chemically equivalent amount of hydrochloric acid.

5. The process of stabilizing a polyvinyl acetal resin which comprises condensing an aldehyde with a polyvinyl fatty acid ester in the presence of less than 5% (based on the weight of the polyvinyl fatty acid ester) of a compound selected from the group consisting of an alkali metal thiosulfate and an alkali metal hydrosulphite and more than a chemically equivalent amount of hydrochloric acid.

6. The process of stabilizing a polyvinyl acetal resin which comprises condensing an acetaldehyde with polyvinyl acetate in the presence of a strong mineral acid and less than 5% of hydrosulfurous acid.

7. The process of stabilizing a polyvinyl acetal resin which comprises condensing an aldehyde with a polyvinyl fatty acid ester in the presence of hydrochloric acid and less than 5% (based on the weight of the polyvinyl ester) of sodium thiosulfate.

DONALD R. SWAN.